US011761322B2

(12) United States Patent
Hebert

(10) Patent No.: US 11,761,322 B2
(45) Date of Patent: Sep. 19, 2023

(54) FATIGUE MONITORING OF COILED TUBING IN DOWNLINE DEPLOYMENTS

(71) Applicant: Halliburton Energy Services, Inc., Houston, TX (US)

(72) Inventor: Galen Roy Hebert, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/657,762

(22) Filed: Apr. 4, 2022

(65) Prior Publication Data

US 2022/0220840 A1 Jul. 14, 2022

Related U.S. Application Data

(63) Continuation of application No. 16/489,763, filed as application No. PCT/US2017/034835 on May 26, 2017, now abandoned.

(51) Int. Cl.
*E21B 47/007* (2012.01)
*E21B 19/22* (2006.01)
(Continued)

(52) U.S. Cl.
CPC .......... *E21B 47/007* (2020.05); *B63B 35/03* (2013.01); *E21B 19/22* (2013.01); *E21B 19/24* (2013.01);
(Continued)

(58) Field of Classification Search
CPC ........ E21B 47/007; E21B 19/08; E21B 19/22; E21B 19/24; B63B 35/03; F16L 1/203; F16L 1/235; G01L 5/04
(Continued)

(56) References Cited

U.S. PATENT DOCUMENTS 6,321,596 B1 * 11/2001 Newman ............... G01N 3/32
73/811
8,504,308 B2 * 8/2013 Li .......................... E21B 47/007
702/9

(Continued)

FOREIGN PATENT DOCUMENTS

WO WO 2010/047964 A1 4/2010

OTHER PUBLICATIONS

International Search Report and The Written Opinion of the International Search Authority, or the Declaration, dated Nov. 30, 2017, PCT/US2017/034835, 19 pages, ISA/KR.

*Primary Examiner* — Matthew R Buck
*Assistant Examiner* — Patrick F Lambe
(74) *Attorney, Agent, or Firm* — Thomas Rooney; C. Tumey Law Group PLLC

(57) ABSTRACT

Methods for real-time coiled tubing fatigue monitoring can establish a remaining operational life of a coiled tubing strand. Standard or low-cycle plastic fatigue in bending is measured each time the coiled tubing strand is deployed through a guide arch. Also, smaller, but higher frequency loads, e.g., high cycle loads imparted to the coiled tubing strand due to interaction with an oceanic environment, are also measured. A plurality of weight detectors may be coupled to a support frame below the guide for monitoring the high-cycle loads. The remaining operational life of the coiled tubing strand may be calculated based on both the plastic strains using a low-cycle fatigue analysis and the elastic strains using a high-cycle fatigue analysis. An operator may retire a coiled tubing strand prior to failure based on the calculated remaining operational life.

20 Claims, 4 Drawing Sheets

(51) Int. Cl.
*E21B 19/24* (2006.01)
*G01L 5/04* (2006.01)
*B63B 35/03* (2006.01)
*F16L 1/20* (2006.01)
*F16L 1/235* (2006.01)

(52) U.S. Cl.
CPC ............... *F16L 1/203* (2013.01); *G01L 5/04* (2013.01); *F16L 1/235* (2013.01)

(58) Field of Classification Search
USPC .......................................................... 702/34
See application file for complete search history.

(56) References Cited

U.S. PATENT DOCUMENTS

| | | | |
|---|---|---|---|
| 2004/0065475 A1* | 4/2004 | Laursen | E21B 7/128 175/7 |
| 2006/0101914 A1 | 5/2006 | McCoy | |
| 2007/0187108 A1 | 8/2007 | Zheng | |
| 2008/0077332 A1* | 3/2008 | Newman | G01N 3/32 702/33 |
| 2010/0018703 A1* | 1/2010 | Lovell | E21B 23/12 166/255.2 |
| 2011/0192599 A1* | 8/2011 | Surjaatmadja | E21B 47/098 166/242.2 |
| 2014/0207390 A1* | 7/2014 | Zheng | G01N 29/043 702/34 |
| 2016/0222777 A1* | 8/2016 | LeBlanc | E21B 47/06 |
| 2016/0362973 A1* | 12/2016 | Turner | E21B 19/08 |
| 2016/0369614 A1* | 12/2016 | Turner | E21B 19/22 |

\* cited by examiner

FATIGUE MONITORING OF COILED TUBING IN DOWNLINE DEPLOYMENTS

CROSS REFERENCE TO RELATED APPLICATION

The present application is a Continuation of U.S. patent application Ser. No. 16/489,763, filed Aug. 29, 2019, which is a U.S. National Stage patent application of International Patent Application No. PCT/US2017/034835, filed on May 26, 2017, the entire content of each of which is hereby incorporated by reference herein.

BACKGROUND

The present disclosure relates generally to monitoring operational forces imparted to a coiled tubing strand, e.g., a coiled tubing strand employed for oil and gas exploration, drilling and production. More particularly, embodiments of the disclosure relate to systems and methods for real-time monitoring of high-cycle fatigue in the coiled tubing strand.

In operations related to the production of hydrocarbons from subterranean geologic formations, coiled tubing is often employed to facilitate wellbore drilling, maintenance, treatment, stimulation and other wellbore processes. Coiled tubing generally includes a continuous strand of a flexible tube that may be wound and unwound from a reel. The length of a coiled tubing strand may be in the range of about 100 feet to over 30,000 feet in some instances, and thus, the coiled tubing strand may be unwound from a spool to readily lower a downhole tool to a subterranean and/or subsea location.

Operational forces may fatigue the coiled tubing strand, which affects the operational life of the coiled tubing strand. Low-cycle fatigue is characterized by high amplitude and low frequency plastic strains, which may be imparted to a coiled tubing strand, e.g., by winding and unwinding the coiled tubing strand from the reel. High-cycle fatigue is characterized by low amplitude and high frequency elastic strains, which may be imparted to a coiled tubing strand, e.g., by waves and ocean currents in an offshore deployment. Both low-cycle fatigue and high-cycle fatigue affect the operational life span of a particular coiled tubing strand.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure includes systems and methods for real-time coiled tubing fatigue monitoring that can establish the remaining operational life of a coiled tubing strand. Each time the coiled tubing strand is deployed, the coiled tubing strand incurs standard (low-cycle) plastic fatigue in bending as the coiled tubing string bends from a reel through a guide arch. Also, the coiled tubing strand experiences smaller, but higher frequency loads (high-cycle) that impart elastic strains in the coiled tubing, e.g., due to interaction with an oceanic environment. A plurality of weight detectors may be coupled to a support frame below the guide arch that receives the coiled tubing strand from the reel. Signals provided by the plurality of weight detectors may be monitored to determine the directionality and magnitude of forces that impart elastic strains to coiled tubing strand. The remaining operational life may be calculated based in part on the elastic strains using a high-cycle fatigue analysis. Plastic strains may also be monitored with strain and/or gyroscopic sensors coupled to a tubing guide or to other equipment. The remaining operational life of the coiled tubing strand may be calculated based on both the elastic and plastic strains. As a result, an operator may be provided with an accurate fatigue history file that maps the fatigue assumed by the coiled tubing at any given point along its length.

Figure 1:
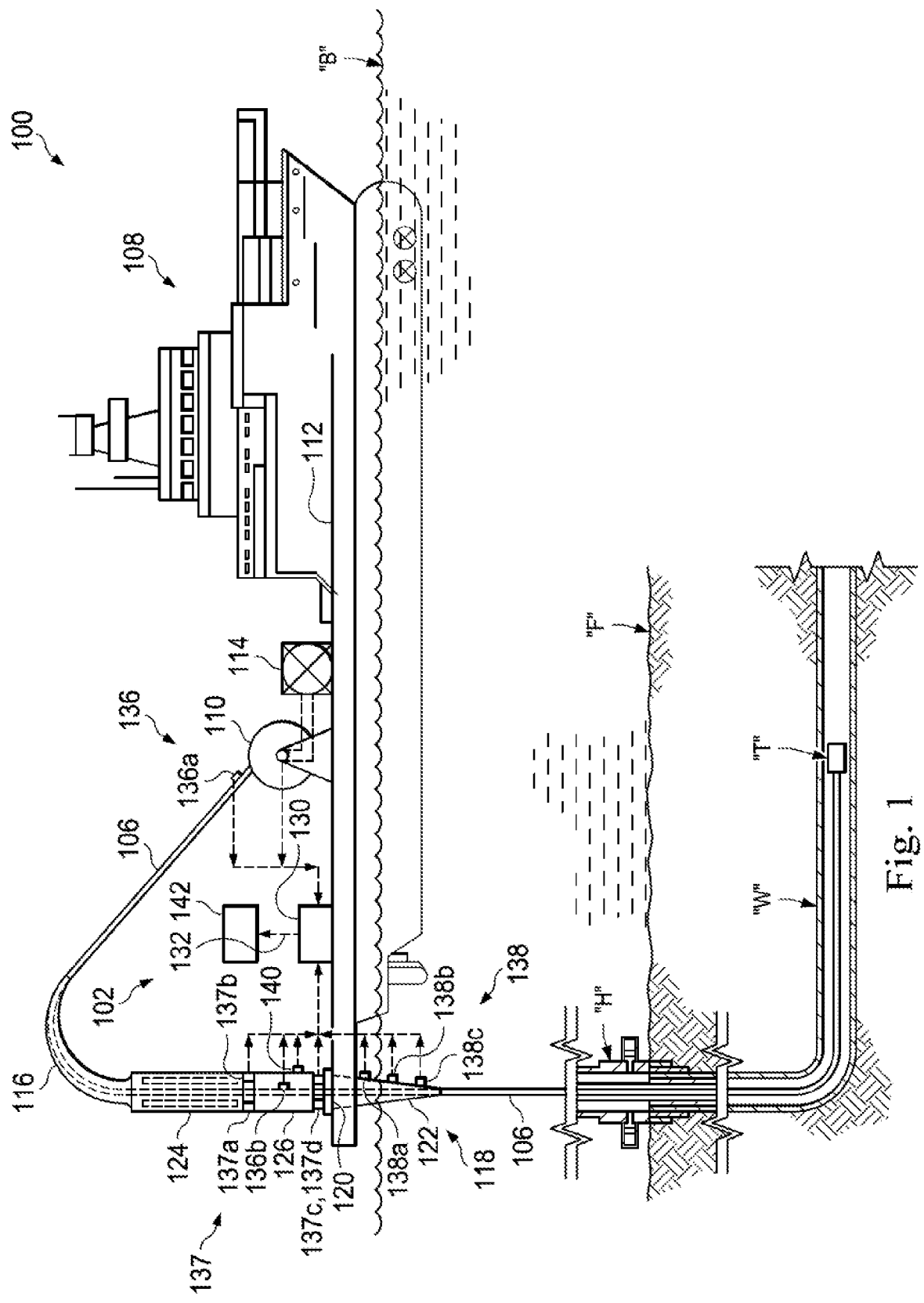
FIG. 1 is a partially cross-sectional side view of an offshore coiled tubing deployment system including a fatigue tracking system for monitoring high-cycle fatigue and low-cycle fatigue of a coiled tubing strand.

FIG. 1 is a partially cross-sectional side view of an offshore coiled tubing deployment system 100 including a fatigue tracking system 102 for monitoring high-cycle and low cycle fatigue of a coiled tubing strand 106. The coiled tubing deployment system 100 may include or otherwise be used in conjunction with an offshore rig or vessel 108 configured to operate in an offshore environment that includes a body of water "B." In some embodiments, as illustrated, the offshore vessel 108 may comprise a floating service vessel or boat. In other embodiments, however, the offshore vessel 108 may comprise any offshore platform, structure, or vessel used in subsea intervention operations common to the oil and gas industry. The body of water "B" may include, but is not limited to, an ocean, a lake, a river, a stream, or any combination thereof. In other embodiments (not shown), the coiled tubing deployment system 100 may be used in conjunction with an onshore or terrestrial surface reference location.

The offshore vessel 108 may be used to deploy the coiled tubing strand 106 into a deployed location such as the body of water "B" for various subsea purposes. For example, the coiled tubing string 106 may be deployed for intervention in a subterranean wellbore "W" with a well intervention tool "T." The wellbore intervention tool "T" may be lowered on the coiled tubing strand 106 through a subsea wellhead "H" positioned on the ocean floor "F." In the embodiments illustrated in FIG. 1, the wellbore intervention tool "T" is employed in a riser-less subsea operation wherein the coiled tubing strand 106 extends directly through the body of water "B." In other embodiments, the coiled tubing strand 106 may extend through a riser (not shown) extending between the offshore vessel 108 and the wellhead "H." In some embodiments, the coiled tubing strand 106 may comprise a conduit or umbilical used to convey fluids or power to the wellhead "H," a submerged platform (not shown), a subsea pipeline (not shown) or to any other subsea location. The coiled tubing strand 106 may be made of a variety of deformable materials including, but not limited to, a steel alloy, stainless steel, titanium, other suitable metal-based materials, thermoplastics, composite materials (e.g., carbon fiber-based materials), and any combination thereof. The coiled tubing strand 106 may exhibit a diameter of about 3.5 inches, but may alternatively exhibit a diameter that is greater or less than 3.5 inches, without departing from the scope of the disclosure.

The coiled tubing strand 106 may be deployed from a reel 110 positioned on a deck 112 of the offshore vessel 108. The coiled tubing strand 106 may be wound multiple times around the reel 110 for ease of transport. In some embodiments, a fluid source 114 may be communicably coupled to the coiled tubing strand 106 via a fluid conduit 116. The fluid source 114 may be configured to convey a pressurized fluid, such as a gas or a liquid, into the coiled tubing strand 106. The presence and amount of pressure in the coiled tubing strand 106 may affect the mechanical strength of the coiled tubing strand 106. For instance, depending on whether or not the coiled tubing strand 106 is pressurized, more or less bending may be imparted in the coiled tubing strand 106 during operation. Low fluid pressure will result in a first bending potential, while higher fluid pressure will result in a second bending potential.

From the reel 110, the coiled tubing strand 106 may be fed into a guide arch 116, commonly referred to in the oil and gas industry as a "gooseneck." The guide arch 116 redirects the coiled tubing strand 106 toward an optional tubing guide 118, which is operatively coupled to the guide arch 116 and fixed to a frame or the deck 112 of the offshore vessel 108. As used herein, the term "operatively coupled" refers to a direct or indirect coupling engagement between component parts of the coiled tubing deployment system 100. In some embodiments, for instance, the tubing guide 118 may be directly coupled to the guide arch 116. In other embodiments, as illustrated, the tubing guide 118 may be indirectly coupled to the guide arch 116 with one or more structural components interposing the tubing guide 118 and the guide arch 116. The guide arch 116 may comprise a rigid structure that exhibits a known radius. As the coiled tubing strand 106 is conveyed through the guide arch 116, the coiled tubing strand 106 may be plastically deformed and otherwise re-shaped and re-directed for receipt by the tubing guide 118 located there below.

The tubing guide 118 may be any device or structure used to convey the coiled tubing strand 106 into the body of water "B." In some embodiments, the tubing guide 118 may comprise a "bend stiffener," for example. In the illustrated embodiment, the tubing guide 118 may include an optional flange 120 and an optional tapering body 122. The flange may rest on the deck 112 of the offshore vessel 108, and the tapering body 122 may extend from the flange 120 through the deck 112 of the offshore vessel 108. In some embodiments, as illustrated, the tapering body 122 may extend to the body of water "B" such that the coiled tubing strand 106 is deployed directly into the body of water "B".

The flange 120 may operate to support the tubing guide 118 on the offshore vessel 108, and may also provide a connection location to attach the components located thereabove. Thus, a type of riser is effectively formed for the coiled tubing strand 106, i.e., the coiled tubing strand 106 extends through components located above the tubing guide and through the tubing guide 118 into the body of water "B". Accordingly, the flange 120 may be characterized as any box-type frame or other structure capable of accomplishing the aforementioned tasks. Moreover, it will be appreciated, that the tubing guide 118 may be alternatively secured to the offshore vessel 108 in a variety of other ways, without departing from the scope of the disclosure. For instance, in some embodiments, the offshore vessel 108 may include a moon pool (not shown) and the tubing guide 118 may be secured to the offshore vessel 108 at or near the moon pool such that the coiled tubing strand 106 is deployed into the body of water "B" through the moon pool.

The tubing guide 118 may be configured to protect the coiled tubing strand 106 at a critical point of high stress assumed by the coiled tubing strand 106. The tubing guide 118 may be made of a material similar to that of the coiled tubing strand 106 and, therefore, the tubing guide 118 may be configured to reinforce the mechanical properties (e.g., rigidity) of the coiled tubing strand 106 as the coiled tubing strand 106 traverses the tubing guide 118. The size of the tubing guide 118, such as the thickness of the tapering body 122, may serve to spread critical loads assumed by the coiled tubing strand 106 over the length of the tubing guide 118, which may help improve the working life of the coiled tubing strand 106. In some embodiments, the tubing guide 118 may include a liner (not shown) that directly contacts the coiled tubing strand 106 as it passes through the tubing guide 118. As will be appreciated, this may prove advantageous in preventing the materials of the tubing guide 118 and the coiled tubing strand 106 from abrasive contact against one another.

In some embodiments, as illustrated, an injector 124 and a support frame 126 may be secured to the offshore vessel 108, and both the injector 124 and the support frame 126 may interpose the guide arch 116 and the tubing guide 118. In some embodiments, the support frame 126 may be included to couple the injector 124 to the tubing guide 118. The injector 124 may be configured to advance or retract the coiled tubing strand 106 during deployment of the coiled tubing strand 106. In some embodiments, for example, the injector 124 may include a plurality of internal gripping elements or wheels (not shown) configured to engage the outer surface of the coiled tubing strand 106 to either pull the coiled tubing strand 106 from the reel 110 and into the tubing guide 118, or retract the coiled tubing strand 106 from the body of water "B" to be wound again on the reel 110. In some embodiments, however, the injector 124 may be omitted. For example, the weight of the coiled tubing strand 106 may instead be relied upon for deployment of the coiled tubing strand into the body of water "B," and the reel 110 may be motorized to retract the coiled tubing strand 106.

The support frame 126 may be configured to transfer the weight assumed by the injector 124 to the deck 112 of the offshore vessel 108. In embodiments where the injector 124 is omitted, the support frame 126 may couple the guide arch 116 to the tubing guide 118 or directly to the deck 112 of the offshore vessel 108.

As the coiled tubing strand 106 is unwound from the reel 110 and fed through the guide arch 116 and the tubing guide 118, it is plastically deformed. This cycled bending is naturally repeated in reverse upon retracting the coiled tubing strand 106 to be wound back around the reel 110. Moreover, additional forces and bending stresses can be assumed by the coiled tubing strand 106 as it enters the body of water "B," particularly in riser-less subsea applications, as illustrated in FIG. 1. More particularly, in cases where the body of water "B" is open ocean, subsea currents, ocean heaving, waves, and other dynamic oceanic phenomena can all place strain and bending stress on the coiled tubing strand 106 as it is deployed. Over time, these bend cycles include both plastic and elastic strains in the coiled tubing strand 106, which may result in considerable fatigue, ultimately affecting the overall operational life of the coiled tubing strand 106.

Bending forces assumed by the coiled tubing strand 106 between the reel 110 and the injector 124 can be generally ascertained using known parameters, such as the diameter of the coiled tubing strand 106, the radius of the guide arch 116, and the pressure within the coiled tubing strand 106. Ascertaining the bending forces assumed by the coiled tubing strand 106 at or following the tubing guide 118, however, can be less certain in view of the unpredictable dynamic environment of the body of water "B," which provides essentially no known variables. According to embodiments of the present disclosure, the bending forces assumed by the coiled tubing strand 106 at or following the tubing guide 118 may be monitored and quantified in real-time and those measurements may be mapped along the length of the coiled tubing strand 106 to determine fatigue life of the coiled tubing strand 106.

To monitor the bending and fatigue of the coiled tubing strand 106 in real-time, the fatigue tracking system 102 is provided with the coiled tubing deployment system 100. The fatigue tracking system 102 may provide a reliable method for establishing and recording, both in real-time and in memory mode, the bending forces that induce both plastic and elastic strains assumed by the coiled tubing strand 106, e.g., at or near the tubing guide 118 and otherwise in the region between the reel 110 and the body of water "B." As described below, the fatigue tracking system 102 may be configured to record the resultant forces and bending levels encountered by the coiled tubing strand 106 and link those measurements back to the location along the length of the coiled tubing strand 106 where the forces were assumed. As a result, induced fatigue and the corresponding level of bending for each section of the coiled tubing strand 106 run through the coiled tubing deployment system 100 may be established and mapped back into a fatigue history file. Once segments of the coiled tubing strand 106 begin to reach predetermined fatigue limits as based on the fatigue history file, an operator may consider retiring the coiled tubing strand 106 to avoid failure.

As illustrated, the fatigue tracking system 102 may include a plurality of load cells, sensors and/or other devices, each communicably coupled to a data acquisition system 130. The data acquisition system 130 is configured to receive and process signals deriving from each load cell, sensor and/or device. The data acquisition system 130 may be a computer system, for example, that includes a memory, a processor, and computer readable instructions that, when executed by the processor, process the sensor signals to provide an output signal 132. Data corresponding to the construction parameters of the coiled tubing strand 106 may be provided to the data acquisition system 130 for reference. For instance, construction parameters of the coiled tubing strand 106 loaded into the data acquisition system 130 may include material grade, length, outer diameter, and inner diameter of the coiled tubing strand 106. Additional construction parameters that may be loaded into the data acquisition system 130 include the location of segment welds or joints along the body of the coiled tubing strand 106. The construction parameters may be used by the data acquisition system 130 as reference points in generating the fatigue history file.

The fatigue tracking system 102 may further include a pressure transducer or sensor 134 used to measure the real-time pressure within the coiled tubing strand 106 during operation. The pressure sensor 134 may be fluidly coupled to the coiled tubing strand 106 and, more particularly, communicably coupled to the coiled tubing strand 106 at the fluid conduit 116, which, as mentioned above, provides pressurized fluid into the coiled tubing strand 106 from the fluid source 114. The real-time pressure detected by the pressure sensor 134 may be transmitted to the data acquisition system 130 for processing. More particularly, the data acquisition system 130 may take into consideration the detected pressure in calculating fatigue on the coiled tubing strand 106 since the internal pressure may affect the mechanical strength of the coiled tubing strand 106.

In the illustrated embodiment, the fatigue tracking system 102 may also include one or more depth counters 136a, 136b (collectively 136) located at fixed points along the path traversed by the coiled tubing strand 106 through the coiled tubing deployment system 100. In some embodiments, a first depth counter 136a may be located at or immediately after the reel 110. Additionally or alternatively, a second depth counter 136b may be located immediately below the injector 124 and otherwise between the reel 110 and the tubing guide 118. The depth counters 136a, 136b may comprise any measurement devices capable of monitoring how much length of the coiled tubing strand 106 is deployed from the reel 110 and bypasses the depth counters 136a, 136b. In some embodiments, for instance, the depth counters 136a, 136b may include a depth wheel that physically engages the coiled tubing strand 106 while it turns to register the traversed length of the coiled tubing strand 106. In some other embodiments, however, the depth counters 136a, 136b may comprise an optical measurement device, such as a laser sight capable of converting optical images into distance measurements.

Measurements obtained by the depth counters 136a, 136 may be transmitted to the data acquisition system 130 for processing. As will be appreciated, knowing the length of the coiled tubing strand 106 deployed, may allow the data acquisition system 130 to map the coiled tubing strand 106 and correlate specific real-time weight, strain or bend measurements with the precise location where such forces were assumed by the coiled tubing strand 106. Accordingly, the measured distance or length may be mapped over time and correlated to high-cycle and low-cycle fatigue at known points along the coiled tubing strand 106, which form part of the fatigue history file.

Figure 2:
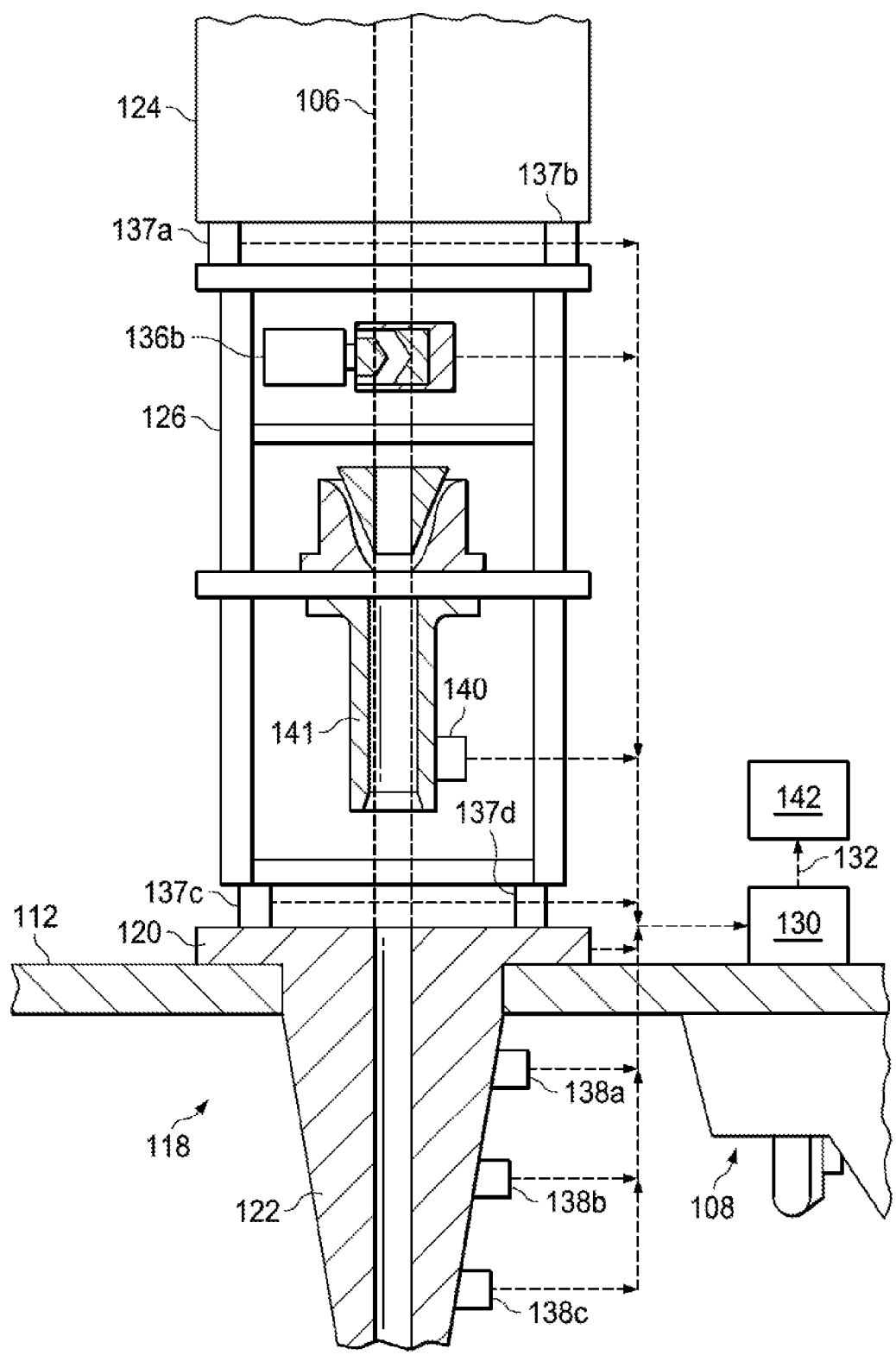
FIG. 2 is an enlarged view of a data acquisition system of the fatigue tracking system of FIG. 1 illustrating various sensors for detecting operational stresses imparted to the coiled tubing strand.

FIG. 2 is an enlarged view of the data acquisition system 130 of the fatigue tracking system 102 illustrating various sensors disposed below the guide arch 116 for detecting operational stresses imparted to the coiled tubing strand 106. With reference to FIG. 2 and continued reference to FIG. 1, the fatigue tracking system 102 includes one or more load cells, transducers, weight sensors or other weight detectors 137a, 137b, 137c 137d (collectively 137) that may be employed to measure a characteristic value indicative of the real-time surface weight of the coiled tubing strand 106, e.g., a portion of the weight of the coiled tubing strand 106 carried by the guide arch 116, during operation of the coiled tubing deployment system 100. In some embodiments, the characteristic value may include acceleration, deceleration, stress, strain and/or, of course, weight. The weight detectors 137 may be sensitive to real-time changes in mass, acceleration and force on the guide arch 116, and may be coupled indirectly to the guide arch 116 and/or coiled tubing strand 106. More particularly, the weight detectors 137 may be coupled to structural components between the guide arch 116 and the deck 110 of the offshore vessel 108 that transfers the weight of the coiled tubing 106 onto the deck 110. In some embodiments, a first plurality of weight detectors 137a, 137b are disposed between the injector 124 and the support frame 116. The weight detectors 137a, 137b are disposed at distinct locations around the coiled tubing strand 106, and thus, a directionality of forces imparted to the coiled tubing strand may be determined from the weight detectors 137a, 137b. Although only two weight detectors 137a and 137b are illustrated between the injector 124 and the support frame 126, three or more weight detectors 137 may be disposed in a circular array around the coiled tubing strand 106. In some embodiments, e.g., embodiments where the injector 124 is omitted, the weight detectors 137 may additionally or alternatively be coupled between the support frame 126 and the deck 112 as illustrated by weight detectors 137c, 137d.

Additional or alternative weight detectors 137 may be provided via a mechanism (not shown) that transfers the weight of the coiled tubing strand 106 onto the deck 112 of the offshore vessel 108. Such a mechanism may comprise, for example, a work window into which a set of slip rams can be used to hold stationary the coiled tubing strand 106 or via a load cell located directly below the guide arch 116. The real-time weight measurements detected by the weight detector 137 may be transmitted to the data acquisition system 130 for processing and the data acquisition system 130 may take into consideration the detected weight in calculating fatigue on the coiled tubing strand 106. It has been determined that weight measurements may be particularly indicative of the forces imparting elastic strains to the coiled tubing strand 106. Weight measurements provided by the weight detectors 137 may also be employed to detect heave and movement of the offshore vessel 108, thereby permitting the fatigue tracking system 102 to remove or allow for motion effects of the offshore vessel 108 from the weight measurement signals and/or accelerometer signals.

The fatigue tracking system 102 may optionally include a plurality of bend sensors 138a, 138b, 138c (collectively, bend sensors 138). A first set of bend sensors 138a is located at a first location on the tubing guide 118. More particularly, the first set of bend sensors 138a may be coupled to the tapered body 122 below the flange 120 and may be configured to measure real-time strain assumed by the coiled tubing strand 106 as it is deployed into the body of water "B". The first set of bend sensors 138a may include at least one of a strain sensor and a gyroscopic sensor used to determine the strain on the coiled tubing strand 106 at the first location. The highest strain readings and critical bending points for the coiled tubing strand 106 following the guide arch 116 will be at the tubing guide 118 just below the flange 120. And since the coiled tubing strand 106 may be continuously or continually be moving through the tubing guide 118, the first set of bend sensors 138a may be coupled to the tubing guide 118 at the first location, and the strain measured on the tubing guide 118 may be indicative of the strain assumed by a particular section of the coiled tubing strand 106 as that particular section passes through the first location on the tubing guide. Sensor signals derived from the first set of bend sensors 138a may be transmitted to the data acquisition system 130 for processing.

In some embodiments, the fatigue tracking system 102 may additionally or alternatively include additional bend sensors 138, illustrated as a second set of bend sensors 138b located at a second location on the tubing guide 118, and a third set of bend sensors 138c located at a third location on the tubing guide 118. The second and third locations may be below the first location and otherwise at locations along the tapered body 122 that exhibit smaller thicknesses as compared to the first location. Similar to the first set of bend sensors 138a, the first and/or second sets of bend sensors 138b, 138cc may include at least one of a strain sensor and a gyroscopic sensor used to determine the strain on the coiled tubing strand 106 at the second and third locations, respectively. As will be appreciated, the bending assumed by the coiled tubing strand 106 may be more severe or pronounced nearer the end of the tubing guide 118. The second and third sets of bend sensors 138b, 138c may be configured to detect and report this resultant movement. Sensor signals derived from the second and third sets of bend sensors 138b, 138c may be transmitted to the data acquisition system 130 for processing. As will be appreciated, the length of the tubing guide 118 may vary from project to project and, as a result, the number of sets of bend sensors 138a-c may also vary for optimization. Moreover, since the obtained data will be recorded and matched to known segments or intervals of the coiled tubing strand 106, an increased number of locations to collect data points along the tubing guide 118 may enable increased accuracy.

In some embodiments, the fatigue tracking system 102 may further include a set of reference sensors 140 located at generally stationary position with respect to the deck 112 of the offshore vessel 108, e.g., at a point on the support frame 126 just above the tubing guide 118, or otherwise above the anticipated critical bending point in the coiled tubing strand 106. The reference sensors 140 may include a strain sensor, an accelerometer, and/or a weight detector to monitor and detect heave and movement of the surface vessel 102 during operation. Sensor signals derived from the reference sensors 140 may be transmitted to the data acquisition system 130 for processing. As illustrated, the reference sensors 140 are depicted as being coupled to the support frame 126. However, the reference sensors 140 may alternatively be coupled at any fixed point above the tubing guide 118 and below the guide arch 116, without departing from the scope of the disclosure. In some embodiments, a strain sensor of the reference sensors 140 may be located between the guide arch 116 and the tubing guide 118, while an accelerometer and/or weight detectors (not shown) of the reference sensors 140 may be fixedly attached to the deck 112 of the offshore vessel 108, or at another location remote from the strain sensor 108 to detect the heave and movement of the offshore vessel 108 during operation.

Referring to FIG. 2, the reference sensors 140 are illustrated as being positioned on a spool riser 141 coupled to the support frame 126 above the tubing guide. The support frame 126 is depicted as interposing the injector 124 and the tubing guide 118, and, according to one or more embodiments, the support frame 126 may operate as a work window and thereby facilitate access to the coiled tubing strand 106 and reference sensors 140. In some embodiments, the fatigue tracking system 102 may include multiple sets of reference sensors 140, without departing from the scope of the disclosure. In some embodiments, the fatigue tracking system 102 may include multiple sets of sensors 137, but have no injector 124, without departing from the scope of the disclosure.

The measurements obtained by the reference sensors 140 may provide a control point or offset that may be applied to the measurements obtained by the weight detectors 137 and/or bend sensors 138. More particularly, the data acquisition system 130 may apply the measurements derived from the reference sensors 140 to the measurements derived from the weight detectors 137 and bend sensors 138 to remove the effects of motion of the offshore vessel 108 and the effects of forces and strains imparted to the coiled tubing strand at locations remote from the weight detectors 137 and bend sensors 138. Accordingly, in some embodiments, the data acquisition system 130 may process the sensor signals derived from the weight detectors 137 and bend sensors 138 in view of reference measurements derived from the reference sensors 140.

Each of the sensors 134, 137, 138, 140 and the depth counter 136 may be communicably coupled to the data acquisition system 130 and configured to transmit corresponding measurements thereto in real-time via any known means of telecommunication or data transmission. In some embodiments, for instance, the data acquisition system 130 may be physically wired to one or more of the sensors 134, 137, 138, 140 and the depth counter 136, e.g., through electrical or fiber optic lines. In other embodiments, one or more of the sensors 134, 137, 138, 140 and the depth counter 136 may be configured to wirelessly communicate with the data acquisition system 130, such as via electromagnetic telemetry, acoustic telemetry, ultrasonic telemetry, radio frequency transmission, or any combination thereof.

In some embodiments, as illustrated, the data acquisition system 130 may be arranged at or near the offshore vessel 108. In other embodiments, the data acquisition system 130 may be remotely located and the sensors 134, 137, 138, 140 and the depth counter 136 may be configured to communicate remotely with the data acquisition system 130 (either wired or wirelessly). The data acquisition system 130 may be configured to receive and process the various signals from the sensors 134, 137, 138, 140 and the depth counter 136 in conjunction with the construction parameters of the coiled tubing strand 106. The relative distances between the sensors 134, 137, 138, 140 and the depth counter 136 may also be used as configurable parameters within the data acquisition system 130 in generating the output signal 132.

The output signal 132 may comprise real-time elastic and plastic bending data corresponding to specific locations along the length of the coiled tubing strand 106. In some embodiments, such data may be stored for future reference or consideration. In other embodiments, however, the output signal 132 may be transmitted to a peripheral device 142 for consideration and/or review by an operator in real-time. The peripheral device 142 may include, but is not limited to, a monitor (e.g., a display, a GUI, a handheld device, a tablet, etc.), a printer, an alarm, additional storage memory, etc. In some embodiments, the peripheral device 142 may be configured to provide the operator with a graphical output or display that charts or maps the length of the coiled tubing strand 106 versus estimated fatigue on the coiled tubing strand 106 at any given location. Accordingly, given that fatigue life of the coiled tubing strand 106 is largely a matter of repeated usage, the data acquired by the data acquisition system 130 may be stored and historically tied to the specific coiled tubing strand 106 and thereby form part of the fatigue history file corresponding to the coiled tubing strand 106.

Figure 3:
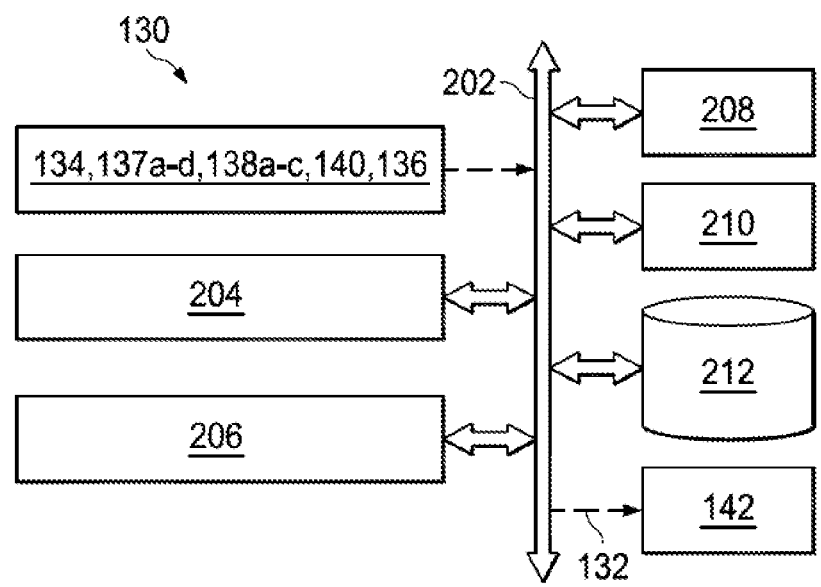
FIG. 3 is a block diagram of the data acquisition system of FIG. 2.

FIG. 3 is a block diagram of the data acquisition system 130. With reference to FIG. 3, and continued reference to FIG. 1, the data acquisition system 130 may include a bus 202, a communications unit 204, one or more controllers 206, a non-transitory computer readable medium (i.e., a memory) 208, a computer program 210, and a library or database 212. The bus 202 may provide electrical conductivity and a communication pathway among the various components of the data acquisition system 130. The communications unit 204 may employ wired or wireless communication technologies, or a combination thereof. The communications unit 204 can include communications operable among land locations, sea surface locations both fixed and mobile, and undersea locations both fixed and mobile. The computer program 210 may be stored partially or wholly in the memory 208 and, as generally known in the art, it may be in the form of microcode, programs, routines, or graphical programming.

The bus 202 is communicatively coupled to the sensors 134, 137, 138, 140 and the depth counters 136 such that the data acquisition system 130 may receive and sample one or more signals derived from the sensors 134, 137, 138, 140 and the depth counters 136. The controller 206 may be configured to transfer the sensor signals to the memory 208, which may encompass at least one of volatile or non-volatile memory. The computer program 210 may be configured to access the memory 208 and process the sensor signals in real-time. In some embodiments, however, the sensor signals may be logged or otherwise stored in the memory 208 or the database 212 for post-processing review or analysis.

In processing the sensor signals, the computer program 210 may be configured to digitize the sensor signal and generate digital data. The computer program 210 may employ pre or post-acquisition processing by applying one or more signal amplifiers and/or signal filters (e.g., low, medium, and/or high-pass frequency filters) in hardware or software. In some embodiments, the computer program 210 may be configured to output the acquired signal in the time domain, thereby providing a time domain output. In another embodiment, the computer program 210 may also be capable of transforming and outputting the digital data in the frequency domain, thereby providing a frequency domain output. This transformation into the frequency domain may be accomplished using several different frequency-based processing methods including, but not limited to, fast Fourier transforms (FFTs), short-time Fourier transforms (STFTs), wavelets, the Goertzel algorithm, or any other domain conversion methods or algorithms known by those skilled in the art. In some embodiments, one or both of the time domain and frequency domain signals may be filtered using at least one of a low-pass filter, a medium-pass filter, and a high-pass filter or other types of filtering techniques, without departing from the scope of the disclosure.

The computer program 210 may further be configured to query the database 212 for stored data corresponding to construction parameters of the coiled tubing strand 106 and relative distances between the sensors 134, 137, 138, 140 and the depth counters 136. Upon querying the database 212, the computer program 210 may be able to apply the construction parameters and relative distances to the measured signals. The computer program 210 may then deliver the output signal 132 comprising real-time, elastic strain and plastic strain bending data corresponding to specific locations along the length of the coiled tubing strand 106. In some cases, as indicated above, the output signal 132 may be provided to the peripheral device 142 for display. In other embodiments, or in addition thereto, the data acquired by the data acquisition system 130 may be stored and historically tied to the fatigue history file corresponding to the coiled tubing strand 106.

Figure 4:
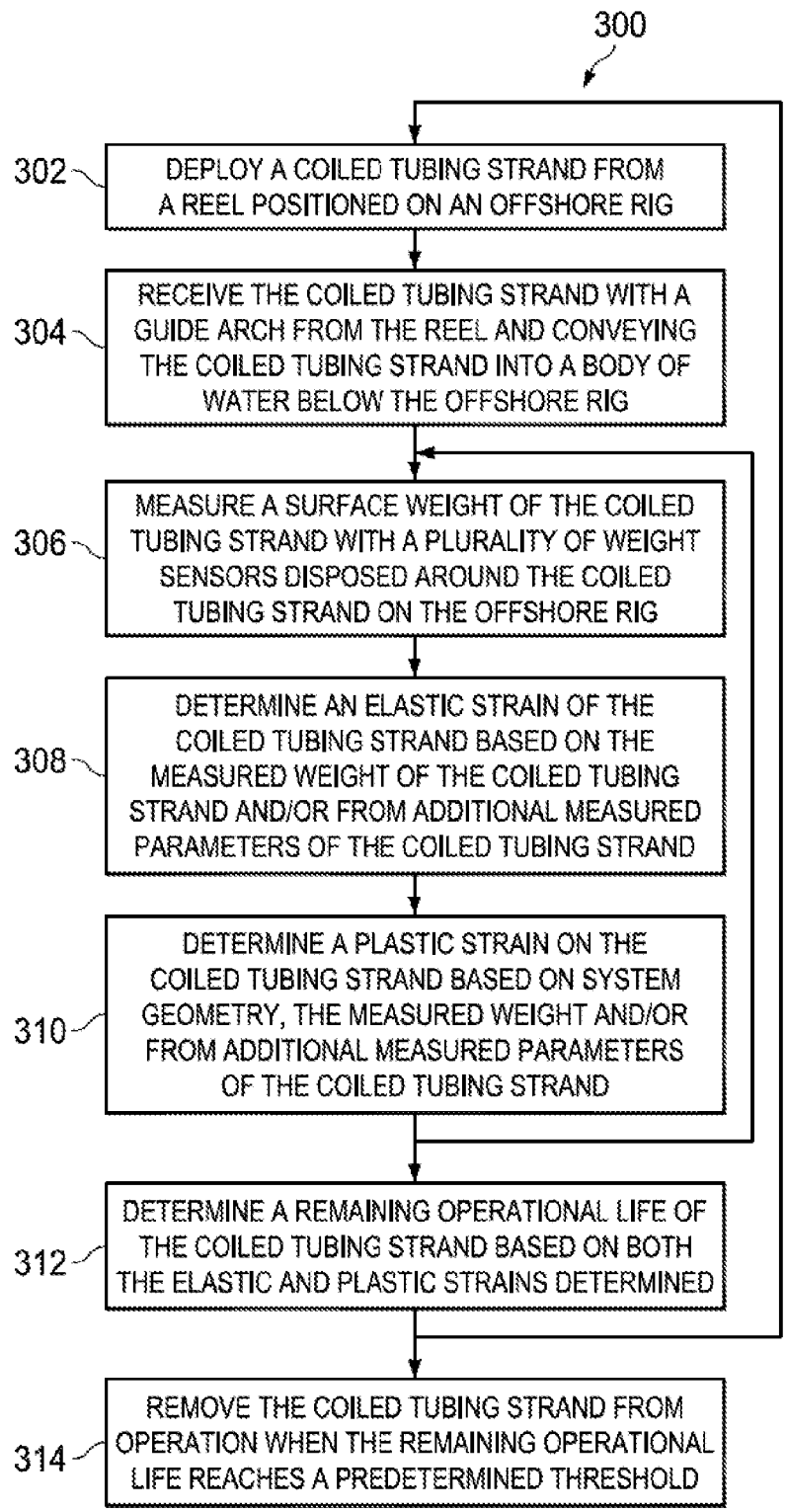
FIG. 4 is a flowchart illustrating an operational procedure for monitoring both high-cycle fatigue and low-cycle fatigue of the coiled tubing strand of FIG. 1.

FIG. 4 is a flowchart illustrating an operational procedure 300 for monitoring both high-cycle fatigue and low-cycle fatigue of the coiled tubing strand 106. Referring to FIG. 4, and with continued reference to FIGS. 1-3, the operational procedure 300 begins at step 302 where the coiled tubing strand 106 is deployed from the reel 110 on the offshore vessel 108. The coiled tubing strand 106 is received over the guide arch 116 and is conveyed into the body of water "B" below the offshore vessel 108 (step 304). In some embodiments, the coiled tubing strand 106 may be conveyed directly through the body of water "B" and into a wellbore "W" to support a wellbore intervention tool "T" therein.

Next, at step 306, a surface weight of the coiled tubing 106, e.g., a real-time weight of the coiled tubing strand 106 carried by the guide arch 116, is measured with a plurality of weight detectors 137 disposed around the coiled tubing strand 106. The measured surface weight has been determined to be a more reliable indicator of elastic strain than other measurable parameters related to the deployment of the coiled tubing strand 106. Thus, an elastic strain of the coiled tubing strand 106 is determined, estimated or calculated based on the measured weight of the coiled tubing strand 106 (step 308). A directionality of the elastic strain imparted to the coiled tubing strand 106 may be determined from the measurement of the surface weight from a plurality of weight detectors 137 disposed at distinct locations surrounding the coiled tubing strand 106. The elastic strain may be determined, estimated or calculated based on the measured weight of the coiled tubing strand, and/or from additional measured parameters of the coiled tubing strand. For example, measurements from bend sensors 138 may be more indicative of elastic strains than the measurements of the weight detectors 137. Thus, the bend sensors 138 may be additionally or alternatively employed to determine the elastic strains.

At step 310, a plastic strain on the coiled tubing strand 106 may be determined from a combination of the geometries of the components of the offshore coiled tubing deployment system 100 (known or measured) together with parameters measured by the fatigue tracking system 102. For example, the known radius associated with the guide arch 116, the dimensions of the reel 110, and the known geometry of the coiled tubing strand 106 stored on the reel 110 may be used together with the internal pressure inside the coiled tubing strand 106 measured by the pressure sensor 134, the measurements of the weight detectors 137 and/or bend sensors 138 to determine the plastic strain.

Steps 306-310 may be continuously or continually repeated throughout a deployment of the coiled tubing strand 106. A fatigue history file that maps the fatigue assumed by the coiled tubing at any given point along its length may be generated for the particular deployment, and the fatigue history file may be associated with the particular coiled tubing strand 106.

A remaining operational life of the coiled tubing strand 106 based on both the elastic and plastic strains may be determined (step 312). The remaining life may be determined at any point in the procedure 300, and not necessarily at the end of a particular deployment. If it is determined that the remaining operational life is above a predetermined threshold, the procedure may return to step 302 for an additional deployment of the coiled tubing strand 106. When it is determined that the remaining operational life has reached or fallen below a predetermined threshold, the procedure 300 may advance to step 314 where the coiled tubing strand 106 is removed from operation and retired.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

In one aspect, the disclosure is directed to a method of evaluating a coiled tubing strand. The method includes (a) deploying the coiled tubing strand from a reel positioned at a surface reference location, (b) receiving the coiled tubing strand with a guide arch positioned on surface reference location and conveying the coiled tubing strand below the surface reference location, (c) measuring one or more characteristic values indicative of a weight of the coiled tubing strand carried by the guide arch with at least one weight detector disposed between the guide arch and the surface reference location, thereby generating one or more weight measurement signals, (d) receiving the one or more weight measurement signals with a data acquisition system communicably coupled to the at least one weight detector, (e) processing the one or more weight measurement signals with the data acquisition system to estimate an elastic strain imparted to the coiled tubing strand, and (f) generating an output signal with the data acquisition system indicative of real-time bending fatigue of the coiled tubing strand based on the elastic strain estimated from the one or more weight measurement signals.

In one or more example embodiments, measuring the characteristic values indicative of the weight of the coiled tubing strand further includes measuring the characteristic value with a plurality of weight detectors disposed at distinct fixed locations with respect to the surface reference location. In some embodiments, the surface reference location is a deck of an offshore vessel, and the method further includes detecting heave and movement of the offshore vessel and allowing for motion effects of the offshore vessel in at least one of the weight measurement signals, an accelerometer signal and a reference sensor signal received with the data acquisition system.

In another aspect, the disclosure is directed to a method of evaluating a coiled tubing strand. The method includes (a) deploying the coiled tubing strand from a reel positioned on an offshore vessel, (b) receiving the coiled tubing strand with a guide arch positioned on the offshore vessel and conveying the coiled tubing strand into a body of water below the offshore vessel, (c) measuring a weight of the coiled tubing strand with at least one weight detector disposed on the offshore vessel, thereby generating one or more weight measurement signals, (d) receiving the one or more weight measurement signals with a data acquisition system communicably coupled to the at least one weight detector, (e) processing the one or more weight measurement signals with the data acquisition system to determine an elastic strain imparted to the coiled tubing strand, and (f) generating an output signal with the data acquisition system indicative of real-time bending fatigue of the coiled tubing strand based on the elastic strain determined from the one or more weight measurement signals.

In one or more example embodiments, measuring the weight of the coiled tubing strand further includes measuring the weight of the coiled tubing strand with a plurality of weight detectors disposed at distinct fixed locations with respect to a deck of the offshore vessel. Processing the one or more weight measurement signals may further include determining a directionality of the elastic strain imparted to the coiled tubing strand with weight measurement signals received from the plurality of weight detectors.

In some embodiments, the method further includes measuring a real-time elastic strain assumed by the coiled tubing strand with one or more bend sensors, thereby generating one or more bend sensor signals. Generating the output signal may further include generating the output signal based on both the one or more weight measurement signals and the elastic strain measured by the one or more bend sensors.

The method, in some embodiments, further includes detecting heave and movement of the offshore vessel and allowing for motion effects of the offshore vessel in at least one of the weight measurement signals, and accelerometer signal and a reference sensor signal received with the data acquisition system. The heave and movement of the offshore vessel may be detected with the at least one weight detector, and/or with a reference sensor. The method may further include determining a remaining operational life of the coiled tubing strand, and may include removing the coiled tubing strand from operation if the remaining operational life of the coiled tubing strand is below a predetermined threshold.

In another aspect, the disclosure is directed to a coiled tubing deployment system. The system includes a reel positioned on a surface reference location and coiled tubing strand wound on the reel. A guide arch is positioned on the surface reference location to receive the coiled tubing from the reel and to direct the coiled tubing strand into a deployed location. At least one weight detector is positioned between the guide arch and the surface reference location. The at least one weight detector is operable to measure one or more characteristic values indicative of a surface weight of the coiled tubing strand and operable to generate one or more weight measurement signals. A data acquisition system is communicably coupled to the at least one weight detector to receive and process the one or more weight measurement signals to determine an elastic strain imparted to the coiled tubing strand. The data acquisition system is further operable to generate an output signal indicative of real-time bending fatigue of the coiled tubing strand based on the elastic strain determined from the one or more weight measurement signals.

In one or more example embodiments, the at least one weight detector includes a plurality of weight detectors disposed at distinct fixed locations with respect to the surface reference location. The system may further include an injector coupled between the guide arch and surface reference location, and weight detectors of the plurality of weight detectors are disposed in array beneath the injector. In some embodiments, the surface reference location is the deck of an offshore vessel and the deployed location is a body of water on to which the offshore vessel is deployed. The system may further include a wellhead disposed within the body of water, and the coiled tubing strand may extend directly through the body of water between the wellhead and the offshore vessel without a riser.

In another aspect, the disclosure is directed to a coiled tubing deployment system. The system includes an offshore vessel having a reel positioned thereon and coiled tubing strand wound on the reel. The offshore vessel is deployable on a body of water. A guide arch is positioned on the offshore vessel to receive the coiled tubing from the reel and to direct the coiled tubing strand through a deck of the offshore vessel and into the body of water. The system also includes at least one weight detector positioned between the guide arch and the deck of the offshore vessel; the at least one weight detector operable to measure a surface weight of the coiled tubing strand and operable to generate one or more weight measurement signals. A data acquisition system is communicably coupled to the at least one weight detector to receive and process the one or more weight measurement signals to determine an elastic strain imparted to the coiled tubing strand. The data acquisition system is further operable to generate an output signal indicative of real-time bending fatigue of the coiled tubing strand based on the elastic strain determined from the one or more weight measurement signals.

In one or more exemplary embodiments, the at least one weight detector includes a plurality of weight detectors disposed at distinct fixed locations with respect to a deck of the offshore vessel. The system may optionally include an injector coupled between the guide arch and the deck of the offshore vessel, wherein the plurality of weight detectors are disposed in array beneath the injector. In some embodiments, the system further includes at least one bend sensor operable to measure a strain in the coiled tubing strand and to generate a bend sensor signal indicative of the elastic strain imparted to the coiled tubing strand. The data acquisition system may be operable to determine a real-time bending fatigue of the coiled tubing strand based on both a plastic strain calculated at least in part based on the geometries of the reel and guide arch and the elastic strain determined by the data acquisition system based on at least one of the at least one weight measurement signal and the strain measured by the at least one bend sensor.

In some embodiments the system further includes a wellhead disposed within the body of water. The coiled tubing strand may extend directly through the body of water in a riser-less manner between the wellhead and the offshore vessel.

In other aspects of the disclosure is directed to a method of evaluating a remaining operational life of a coiled tubing strand. The method includes (a) deploying the coiled tubing strand from a reel positioned on a surface reference location, (b) measuring at least one characteristic value indicative of a surface weight of the coiled tubing strand with at least one weight detector, (c) determining an elastic strain imparted to the coiled tubing strand based on the surface weight of the coiled tubing strand, and (d) estimating the remaining operational life of the coiled tubing strand based on the elastic strain imparted to the coiled tubing strand.

In some embodiments, the method further includes measuring the at least one characteristic value at a plurality of fixed locations on the surface reference location with the at least one weight detector. The method may further include injecting the coiled tubing strand into a body of water with an injector disposed on an offshore vessel, and the plurality of fixed locations may be disposed between the injector and a deck of the offshore vessel.

In other aspects, the disclosure is directed to a method of evaluating a remaining operational life of a coiled tubing strand. The method includes (a) deploying the coiled tubing strand from a reel positioned on an offshore vessel, (b) measuring a surface weight of the coiled tubing strand with at least one weight detector disposed on the offshore vessel, (c) determining an elastic strain imparted to the coiled tubing strand based on the surface weight of the coiled tubing strand, and (d) estimating the remaining operational life of the coiled tubing strand based on the elastic strain imparted to the coiled tubing strand.

In some exemplary embodiments, the method further includes measuring the surface weight of the coiled tubing strand at a plurality of fixed locations on the offshore vessel with the at least one weight detector. The method may further include injecting the coiled tubing strand into the body of water with an injector, and the plurality of fixed locations may be disposed between the injector and a deck of the offshore vessel.

The method, in some embodiments, further includes determining a plastic strain imparted to the coiled tubing strand. Estimating the remaining operational life of the coiled tubing strand may further include estimating the remaining operational life of the coiled tubing strand based on both the plastic strain and the elastic strain imparted to the coiled tubing strand. In some exemplary embodiments, the method may further include measuring an elastic strain imparted to the coiled tubing strand, and estimating the remaining operational life of the coiled tubing strand further comprises estimating the remaining operational life of the coiled tubing strand based on both the elastic strain measured and the elastic strain determined based on the surface weight of the coiled tubing strand. Measuring the elastic strain imparted to the coiled tubing strand may include measuring a stain on the coiled tubing strand with at least one bend sensor disposed on a tubing guide extending below a deck of the offshore vessel.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A method of evaluating a coiled tubing strand, the method comprising:
    deploying the coiled tubing strand from a reel positioned on a surface reference location;
    receiving the coiled tubing strand with a guide arch supported on the surface reference location with a support frame;
    conveying at least a portion of the coiled tubing strand below the surface reference location;
    measuring a surface weight of the coiled tubing strand using two or more weight detectors disposed between a fixed location and the surface reference location to generate two or more weight measurement signals;
    receiving the two or more weight measurement signals with a data acquisition system communicably coupled to the two or more weight detectors;
    processing the two or more weight measurement signals with the data acquisition system to determine an elastic strain of the coiled tubing strand;
    measuring a movement of the surface reference location with an accelerometer disposed at a fixed location with respect to the surface reference location;
    receiving an accelerometer signal from the accelerometer with a data acquisition system communicably coupled to the accelerometer disposed at the fixed location with respect to the surface reference location;
    processing the accelerometer signal with the data acquisition system to estimate bending forces at least one point along the coiled tubing strand based on changes in acceleration detectable in the accelerometer signal; and
    estimating a bending fatigue of the coiled tubing strand based on the elastic strain.

2. The method according to claim 1, further comprising:
    generating an output signal with the data acquisition system indicative of real-time bending fatigue of the coiled tubing strand based on the bending forces estimated from the accelerometer signal.

3. The method according to claim 1, further comprising injecting the coiled tubing strand into a body of water with an injector disposed on an offshore vessel.

4. The method according to claim 3, wherein the surface reference location comprises a deck of the offshore vessel, and wherein the method further comprises detecting heave and movement of the offshore vessel in at least one of the two or more weight measurement signals.

5. The method according to claim 1, wherein the fixed location further comprises the support frame.

6. The method according to claim 1, further comprising estimating a remaining operational life of the coiled tubing strand from at least the bending fatigue and removing the coiled tubing strand from operation if the remaining operational life of the coiled tubing strand is below a predetermined threshold.

7. The method according to claim 1, further comprising generating an output signal comprising elastic bending data corresponding to one or more specific locations along the length of the coiled tubing strand.

8. The method according to claim 7, further comprising mapping the elastic bending data along the coiled tubing string at locations where one or more bending forces were assumed by the coiled tubing strand.

9. A coiled tubing deployment system, comprising:
    a reel positioned on a surface reference location and coiled tubing strand wound on the reel;
    two or more weight detectors disposed at a fixed location with respect to the surface reference location, the two or more weight detectors operable to measure a surface weight of the coiled tubing strand and operable to generate two or more weight measurement signals; and
    a data acquisition system communicably coupled to the two or more weight sensors to receive and process two or more weigh measurement signals to determine an elastic strain imparted to the coiled tubing strand and generate an output signal indicative of real-time bending fatigue of the coiled tubing strand based on the elastic strain.

10. The system according to claim 9, further comprising an injector secured to the surface reference location, and wherein the two or more weight detectors are disposed between the support frame and the surface reference location.

11. The system according to claim 10, further comprising a guide arch to receive the coiled tubing from the reel and to direct the coiled tubing strand into the injector, the guide arch supported on the surface reference location by a support frame with the two or more weight detectors are disposed in an array beneath the injector.

12. The system according of claim 9, further comprising a pressure transducer operable to measure a real-time pressure within the coiled tubing strand, wherein the pressure transducer is communicably coupled to the data acquisition system, and wherein the data acquisition system is operable to generate the output signal based in part on the real-time pressure within the coiled tubing strand.

13. The system according to claim 9, wherein the surface reference location comprises the deck of an offshore vessel, wherein the system further comprises a wellhead disposed within a body of water beneath the offshore vessel, and wherein the coiled tubing strand extends directly through the body of water between the wellhead and the offshore vessel without a riser.

14. A method of evaluating a remaining operational life of a coiled tubing strand, the method comprising:
    deploying the coiled tubing strand from a reel positioned on a surface reference location;
    measuring at least two characteristic values indicative of a surface weight of the coiled tubing strand with at least two weight detectors;
    determining an elastic strain imparted to the coiled tubing strand based on the surface weight of the coiled tubing strand;
    measuring a movement of the surface reference location with an accelerometer disposed at a fixed location and determining bending forces imparted along the coiled tubing strand; and estimating the remaining operational life of the coiled tubing strand based on the elastic strain and the bending forces imparted to the coiled tubing strand.

15. The method according to claim 14, wherein measuring the at least two characteristic values further comprises measuring the at least two characteristic values at a plurality of fixed locations on the surface reference location with the at least two weight detectors.

16. The method according to claim 15, wherein the plurality of fixed locations may be disposed between an injector and a deck of an offshore vessel.

17. The method according to claim 16, further comprising injecting the coiled tubing strand into a body of water with the injector disposed on the offshore vessel.

18. The method according to claim 14, wherein determining bending forces imparted to the coiled tubing strand includes determining the bending forces imparted to the coiled tubing strand at a tubing guide coupled to a deck of the offshore vessel.

19. The method according to claim 14, further comprising retiring the coiled tubing strand when the estimated remaining operational life of the coiled tubing strand reaches a predetermined threshold.

20. The method of claim 14, further comprising generating an output signal indicative of real-time bending fatigue of the coiled tubing strand based on the bending forces estimated from the accelerometer signal.

* * * * *